US010633063B2

(12) United States Patent
Burt et al.

(10) Patent No.: US 10,633,063 B2
(45) Date of Patent: Apr. 28, 2020

(54) RENEWABLE ENERGY BARGE

(71) Applicant: NEPTUNETECH LTD, Kiryat Bialik (IL)

(72) Inventors: Michael Burt, Haifa (IL); Yehiel Rosenfeld, Haifa (IL)

(73) Assignee: NEPTUNETECH LTD, Kiryat, Bialik (IL)

( * ) Notice: Subject to any disclaimer, the term of this patent is extended or adjusted under 35 U.S.C. 154(b) by 0 days.

(21) Appl. No.: 15/780,108

(22) PCT Filed: Nov. 30, 2016

(86) PCT No.: PCT/IL2016/051283
§ 371 (c)(1),
(2) Date: May 30, 2018

(87) PCT Pub. No.: WO2017/094007
PCT Pub. Date: Jun. 8, 2017

(65) Prior Publication Data
US 2018/0354591 A1 Dec. 13, 2018

Related U.S. Application Data

(60) Provisional application No. 62/260,671, filed on Nov. 30, 2015.

(51) Int. Cl.
B63B 35/44 (2006.01)
F03D 9/00 (2016.01)
H02S 10/12 (2014.01)
F03B 13/18 (2006.01)
H02S 10/10 (2014.01)
(Continued)

(52) U.S. Cl.
CPC .............. B63B 35/44 (2013.01); F03B 13/18 (2013.01); F03B 13/1845 (2013.01); F03D 9/007 (2013.01); F03D 9/008 (2013.01); G05B 19/02 (2013.01); H02S 10/10 (2014.12); H02S 10/12 (2014.12); B63B 2035/446 (2013.01); F05B 2220/707 (2013.01); F05B 2220/708 (2013.01); F05B 2240/40 (2013.01); F05B 2240/93 (2013.01); F05B 2240/95 (2013.01); F24S 20/70 (2018.05); G05B 19/056 (2013.01);
(Continued)

(58) Field of Classification Search
CPC .......... B63B 35/44; H02S 10/10; H02S 10/12
See application file for complete search history.

(56) References Cited

U.S. PATENT DOCUMENTS 6,100,600 A 8/2000 Pflanz
8,441,139 B2 5/2013 Karimi
(Continued)

FOREIGN PATENT DOCUMENTS

WO 2009005383 A1 1/2009
WO 2011071444 A1 6/2011
WO 2012026883 A2 3/2012

Primary Examiner — Stephen P Avila
(74) Attorney, Agent, or Firm — William Dippert; Laurence Greenberg; Werner Stemer

(57) ABSTRACT

A barge for renewable energy recourses is disclosed that comprises a plurality of horizontal axis wind turbines, a plurality of photovoltaic panels; and a plurality of sea-wave generators. The energy harvested by the renewable energy recourses is transformed to electrical energy and the electrical energy is transmitted to a grid onshore. A fleet of a plurality of barges located in deep waters is disclosed as well.

20 Claims, 7 Drawing Sheets

(51) Int. Cl.
  *G05B 19/02* (2006.01)
  *F24S 20/70* (2018.01)
  *G05B 19/05* (2006.01)

(52) U.S. Cl.
  CPC ....... *G05B 2219/2619* (2013.01); *Y02E 10/38* (2013.01); *Y02E 10/725* (2013.01); *Y02E 10/727* (2013.01)

(56) References Cited

U.S. PATENT DOCUMENTS

| | | |
|---|---|---|
| 2010/0244450 A1 | 9/2010 | Tabe |
| 2012/0325290 A1 | 12/2012 | Gizara |
| 2012/0328437 A1 | 12/2012 | Tunbjer et al. |
| 2013/0218355 A1 | 8/2013 | Lazaris |
| 2015/0076829 A1* | 3/2015 | Saavedra .................. F03D 5/00 290/55 |
| 2015/0113987 A1* | 4/2015 | Mackler .................. H02S 20/23 60/641.2 |
| 2016/0369646 A1* | 12/2016 | Hendrix ................ F03D 3/0427 |

\* cited by examiner

RENEWABLE ENERGY BARGE

The present application is a National Phase filing under 35 U.S.C. § 371 of International Patent Application No. PCT/IL2016/051283, filed Nov. 30, 2016, which is based upon and claims the benefit of the priority date of U.S. provisional patent application Ser. No. 62/260,671, filed Nov. 30, 2015, each of which is incorporated herein by reference.

TECHNICAL FIELD

The present disclosed subject matter relates to energy harvesting. More particularly, the present disclosed subject matter relates to integration of renewable energy harvesting technologies.

BACKGROUND

Offshore wind power industry has the potential to harvest a major portion of mankind's energy needs. Rising concerns over energy security, global warming, and eventual fossil fuel depletion led to an expansion of interest in all available forms of renewable energy. Worldwide, many thousands of wind turbines are now operating, with a total nameplate capacity of 194,400 MW. Typically, immense wind turbines are positioned in the sea and are spaced about 300 m apart to avoid energy-unfavorable aerodynamic cross-influence of eddies created from the movement of the wind turbines.

Despite the environmental advantages and the free and abundant energy source, there are various costs to set up the commercially available wind energy systems that keep these systems economically questionable. For example, each wind turbine needs to be held stationary, and have a power line leading to the shore. Each one needs to be maintained. Furthermore, the commercially available wind turbines are essentially at sea level and thus do not take advantage of the phenomenon that the wind power increases at higher elevations above sea level.

It is therefore an object of the present invention to provide a system and a method for mitigating these disadvantages.

BRIEF SUMMARY

According to a first aspect of the present disclosed subject matter, a barge comprising renewable energy recourses comprising: a plurality of horizontal axis wind turbines; a plurality of photovoltaic panels; a plurality of sea-wave generators; wherein energy harvested by the renewable energy recourses is transformed to electrical energy; and wherein the electrical energy is transmitted to a grid onshore.

In some exemplary embodiments, at least a portion of the electrical energy is stored in batteries.

In some exemplary embodiments, all the electrical energy is stored in batteries.

In some exemplary embodiments, at least a portion of the energy harvested by the renewable energy recourses is transformed to gas pressure to be stored in pressure accumulator.

In some exemplary embodiments, the energy harvested by the renewable energy recourses is transformed to gas pressure to be stored in pressure accumulator.

In some exemplary embodiments, at least a portion of the energy harvested by the renewable energy recourses is stored as gravitational potential energy by elevating loads and or substantially floating the barge.

In some exemplary embodiments, the energy harvested by the renewable energy recourses is stored as gravitational potential energy by elevating loads and or substantially float the barge.

In some exemplary embodiments, the barge comprises a flotation system capable of substantially floating the barge by injecting gas to a plurality of flotation pipes and semi-submerging the barge by exhausting gas from the plurality of flotation pipes or injecting seawater to the plurality of flotation pipes.

In some exemplary embodiments, the barge have a structure; wherein the structure is based on a plurality of flotation pipes, having a diameter of at least three meters, extending across the barge; wherein the plurality of flotation pipes constitute foundations for a plurality of pillars and a barge-deck; and wherein the flotation pipes are connected to the flotation system.

In some exemplary embodiments, the pillars are situated in rows along the barge, wherein each row comprise a plurality of pillars, wherein each row of pillars along the barge is enforced by a plurality of cables and crossbeams; and wherein each row supports an array of horizontal axis wind turbines all facing the same direction.

In some exemplary embodiments, the a plurality of photovoltaic panels are installed in slight incline on the barge deck;

In some exemplary embodiments, the plurality of sea-wave generators are secured to below the barge deck and wherein buoys of the plurality of sea-wave generators floats on the seawater;

In some exemplary embodiments, the barge further comprises seawater desalination plant, and wherein water produced by the desalination plant is pumped to a tanker ship mooring by the barge.

In some exemplary embodiments, at least a portion of the electrical energy is utilized for operating the seawater desalination plant.

In some exemplary embodiments, the barge is relocatable by tag boats to locations selected from a group comprising of shipyards; a plurality of deep-sea harvesting locations; and a combination thereof.

In some exemplary embodiments, the barge is equipped with maneuvering capability for optimal orientation of the barge toward the wind in order to optimize the plurality of horizontal axis wind turbines yield.

In some exemplary embodiments, the barge is equipped with maneuvering capability for optimal orientation of the barge toward the sun in order to optimize the plurality of photovoltaic panels yield.

In some exemplary embodiments, the barge is equipped with maneuvering capability for optimal orientation of the barge in line with wave's direction in order to optimize the plurality sea-wave generators yield.

In some exemplary embodiments, the barge further comprises electrical structure, wherein the electrical structure comprises: power grid utilized to aggregate alternating current (AC) electrical energy from all resources; step-up transformers for shaping the aggregated AC for transmission; a plurality of batteries configured to store energy; inverters for altering energy stored in batteries to AC; rectifiers configured to alter AC for storage in the batteries; a computerized control system (CCS) configured to monitor and control renewable energy recourses; and an input/output interface configured to transmit and/or receive information and instructions between the CCS and elements selected from a group comprising: devices, actuators and sensors; global positioning system; programmable logic controllers;

temperature sensors; humidity sensors; wind speed and direction sensors; wave sensors; RADAR; water depth gauge; radio communication; the Internet; and a combination thereof.

In some exemplary embodiments, the CCS is further configured to monitor and control the transmission to the shore based on shore demand, and directing excessive energy for storage.

In some exemplary embodiments, the CCS is further configured to enable remote control and monitoring via the Internet.

A fleet comprising a plurality of barges located in deep waters, wherein each barge of the plurality of barges is the barge of claim 1; wherein each barge is connected by at least one branch to power transmission lines; and wherein the power transmission lines aggregates electrical energy of the plurality of barges for transmission from the fleet location to a grid onshore.

According to another aspect of the present disclosed subject matter, A fleet comprising a plurality of barges located in deep waters, wherein each barge of the plurality of barges is the barge of claim 1; wherein each barge is connected by at least one branch to power transmission lines; and wherein the power transmission lines aggregates electrical energy of the plurality of barges for transmission from the fleet location to a grid onshore.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
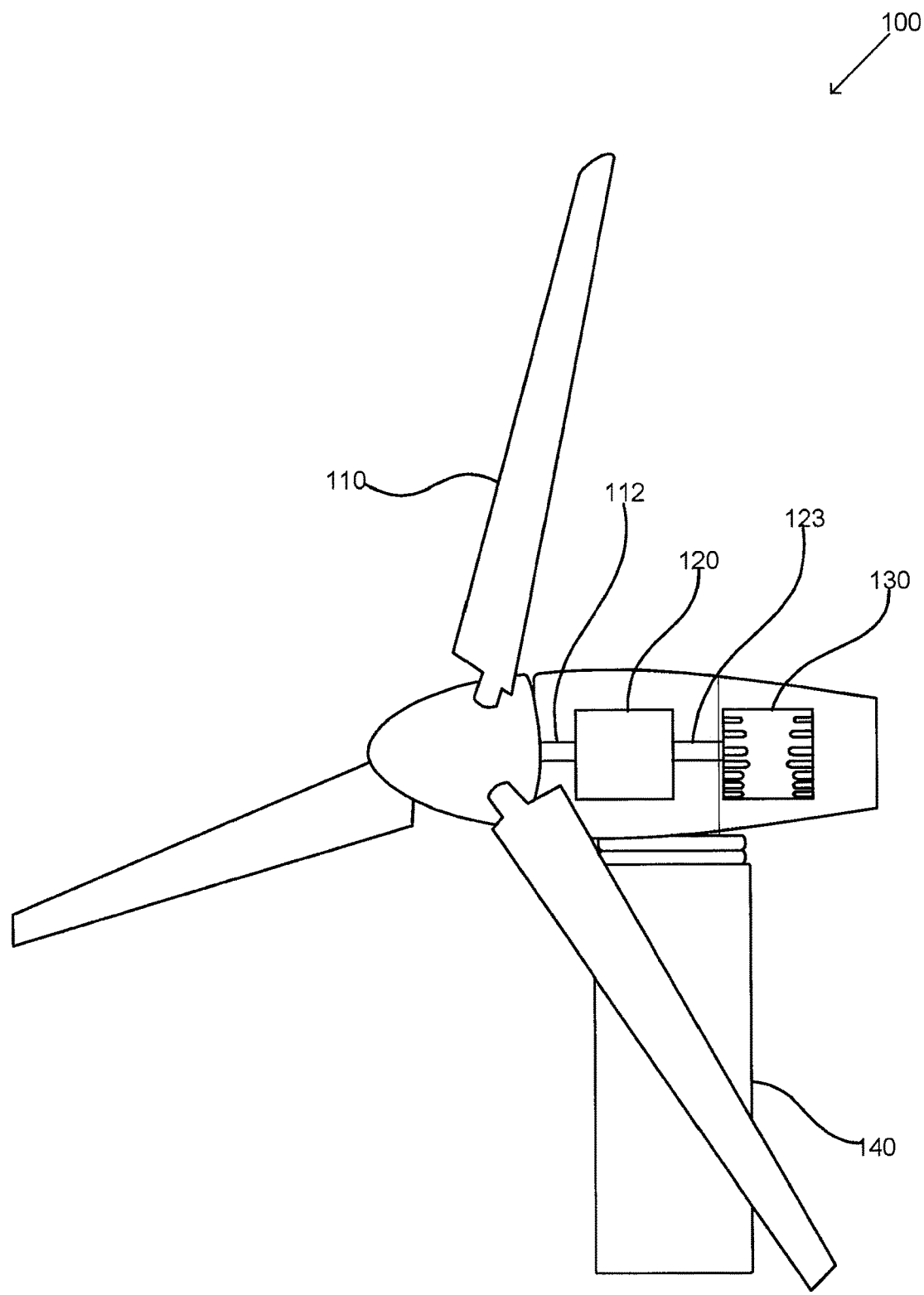
FIG. 1 depicts a commercially available horizontal axis wind turbine (HAWT), in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

The present disclosure provides a marine based scheme and method for harvesting renewable energy. In some exemplary embodiments, the sea based scheme may be a fleet of renewable energy barge(s) (REB), wherein each REB may comprise a plurality of renewable energy recourses selected from a group comprising of: wind turbine, PV panels, sea-waves turbines, a combination thereof, or the like. It will be noted the fleet of renewable energy barges may comprise at least two REBs.

One aspect of the present disclosure is integrating a plurality of renewable energy resources, of different disciplines, on at least one barge, wherein each renewable energy resource have different intensity and volume that is dictated by climatic, geographical region, day/night, seasonal effect, a combination thereof, or the like. For example, in stormy whether the major energy contributors may be sea-waves and wind while in a shiny day the PV panels may become the major energy contributors. In view of the above its concluded that the intensity and volume fluctuations of renewable energy may be time scaled, thus integration of plurality of renewable energy resources (disciplines) can make up (complement) for climate and environmental variations. Therefore, plurality of barges when jointly and logistically operated as a combined renewable energy fleet can potentially turn into an exceptionally cost effective enterprise.

Another aspect of the present disclosure is providing fast and cost effective method for constructing, maintaining and servicing a mobilized renewable energy power plant. In some exemplary embodiments of the disclosed subject matter, a plurality of multidisciplinary energy generating devices (resources), may be compactly assembled on the barge at a highly industrialized shipyard and then towed to a pre-arranged service-marine-site. Additionally, the barge may be towed to shipyards for maintenance and repairs.

Yet another aspect of the present disclosure, is the overall cost reduction of equipping the energy barge with a plurality of wind turbines in a shipyard, in contrast to the enormous assembly and maintenance cost of wind turbines in rural areas. Moreover, the cost of the real-estate occupied by single REB offshore is by far cheaper than onshore. It will also be noted that equipment installed on the REB floating on water surface benefit from a significant lower ambient temperature due to the evaporative cooling effect of water.

Yet another aspect of the present disclosure is when the REB secured in its site of operation, it may be allowed to turn into the wind (as natural conditions might suggest) thus, maximize utilization of the kinetic energy of the wind for optimal energy exploitation.

Yet another aspect of the present disclosure is a capability of storing energy in the REB. Due to the nature of renewable energy, the harvesting yield (mainly depend on climate condition) may not be synchronized with power demands, thus it is mandatory to store excessive (not used) energy in off-peak hours. In some exemplary embodiments, the energy may be stored in batteries, pressure accumulators, gravitational potential energy, a combination thereof, or the like. Additionally or alternatively, the excessive energy may be directed to a seawater desalination plant on board the REB, wherein the desalinated water may be filled into a tanker mooring alongside the REB.

Referring now to FIG. 1, showing a commercially available horizontal axis wind turbine (HAWT) 100, in accordance with some exemplary embodiments of the disclosed subject matter. The HAWT 100 may comprise a plurality of blades 110 connected to the turbine's rotor shaft 112 and an electrical generator. In some exemplary embodiments, the HAWT 100 may have a transmission 120, for converting low speed rotation (i.e., shaft 112 driven by the blades 100) into a higher speed rotation shaft reflected on generator shaft 123. The speed converting may be required to meet typical electrical generator, such as electrical generator 130 efficiency requirements.

Blades 110 range in length from 40 to 80 meters. The blades rotational velocity varies between 10 to 22 revolutions per minute (RPM). At 22 RPM the speed of blade 110 tip exceeds 90 meters per second. In some exemplary embodiments, the turbines may be equipped with protective features to avoid damage at high wind speeds, by feathering the blades into the wind which ceases their rotation, supplemented by brakes.

It should be noted that the amount of energy harvested by wind turbine is proportional to the blades RPM (i.e., wind speed) and the length of the blades. It should be also noted that wind speed increases with altitude arises. Furthermore the wind turbine efficiency grows by pointing the blades to face the wind. In some exemplary embodiments, REBs may comprise wind sensor coupled with computer-controlled motors for rotating the entire REB into the wind, since all the wind turbines on board the REB are aligned in the same direction.

HAWTs 100 that are situated at height of 50 meters above sea level may be sufficient to make use of the wind speeds usually available further above in land. Usually wind turbines start to operate at wind speeds of 4 to 5 meters per second and reach their maximum power at around 15 to 20 meters/second.

Figure 2A:
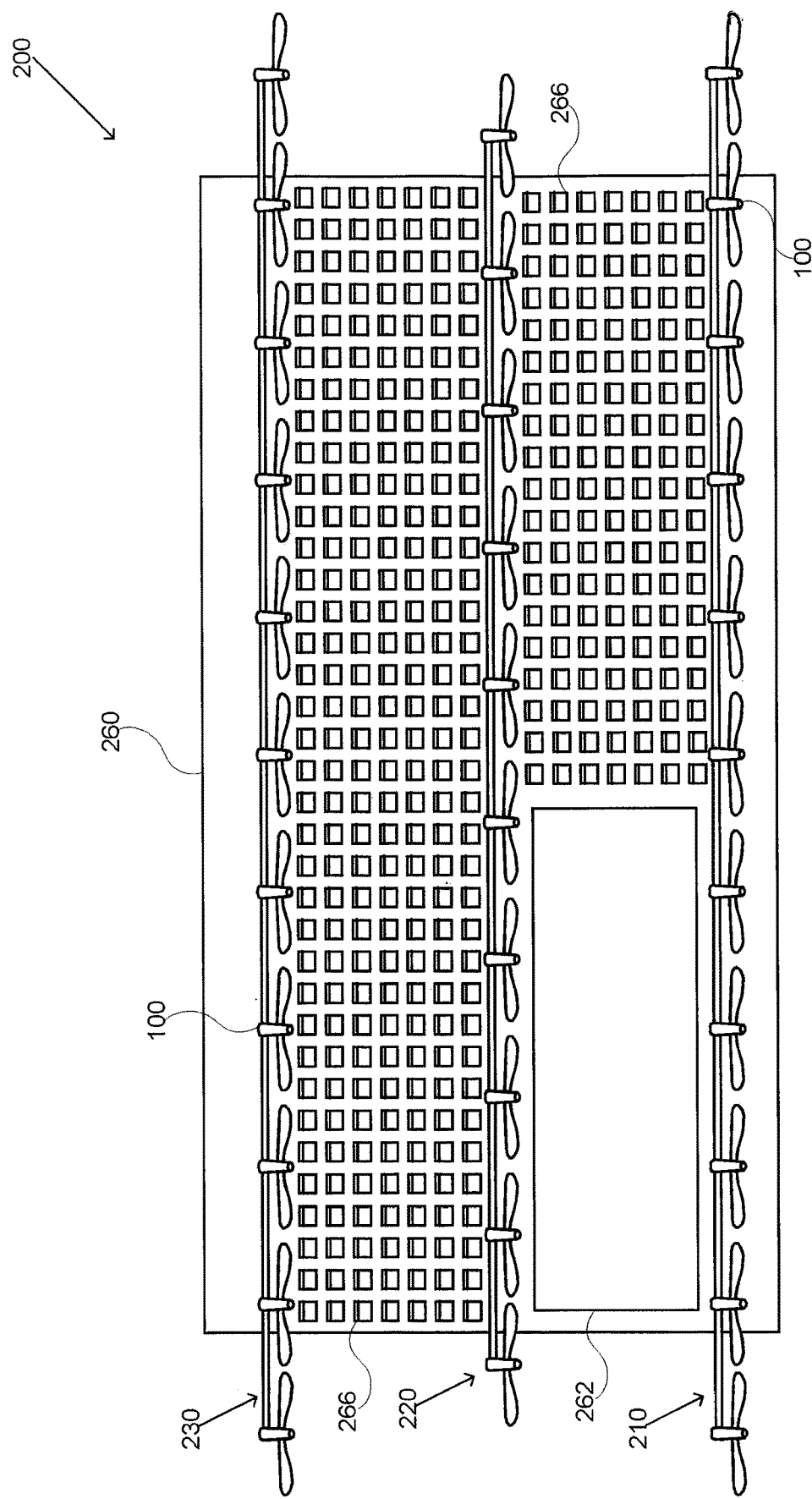
FIG. 2A shows a top view of a renewable energy barge (REB) having a plurality of renewable energy recourses, in accordance with some exemplary embodiments of the disclosed subject matter.
Figure 2B:
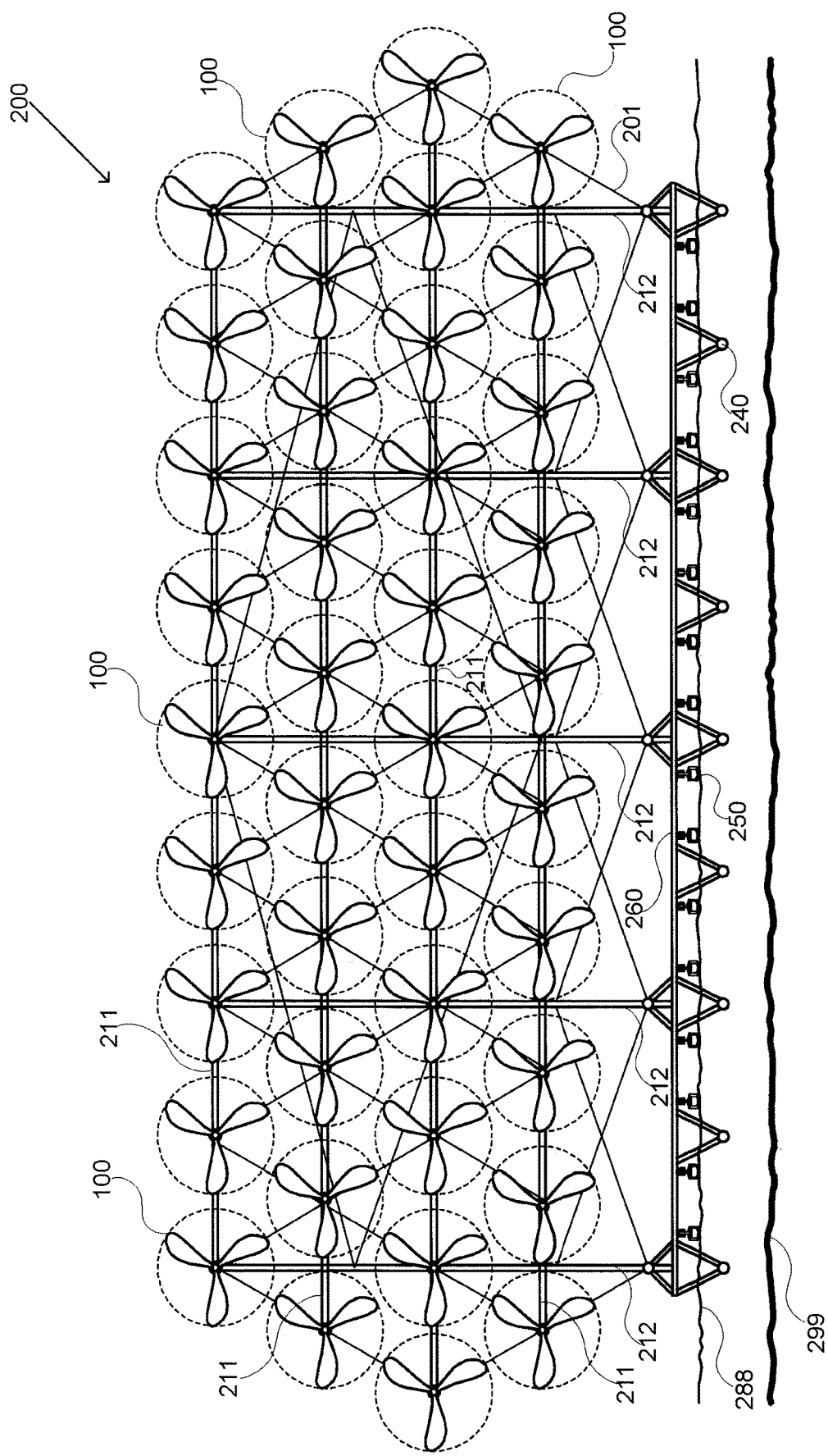
FIG. 2B shows a front view of the REB having a plurality of renewable energy recourses, in accordance with some exemplary embodiments of the disclosed subject matter.
Figure 2C:
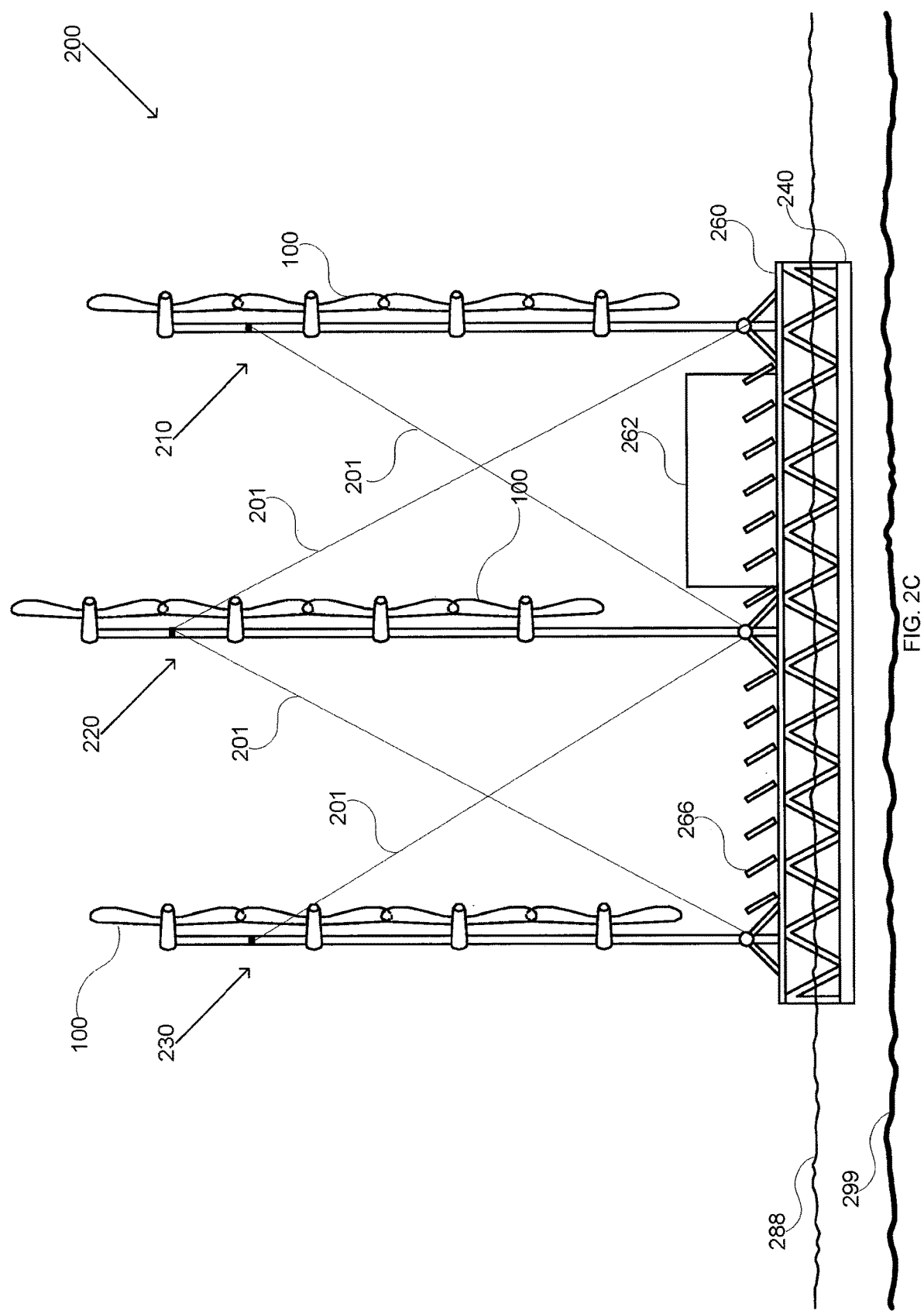
FIG. 2C shows a side view of the REB having a plurality of renewable energy recourses, in accordance with some exemplary embodiments of the disclosed subject matter.

Referring now to FIGS. 2A, 2B and 2C showing front, side and top view of the REB having a plurality of renewable energy recourses, in accordance with some exemplary embodiments of the disclosed subject matter.

REB 200 may comprise a plurality of HAWTs arrays, each comprising a plurality of HAWTs, wherein all the HAWTs in the plurality of HAWTs arrays may be assembled facing the same direction. In some exemplary embodiments, front array 210, middle array 220 and rear array 230 as depicted in FIGS. 2A and 2C are positioned along the REB 200. It should be noted that the amount of recourses/elements/devices, such as the amount HAWTs arrays, depicted in the drawings is intended for illustrative purposes of one exemplary embodiment and doesn't limit the scope of the present disclosure.

Each array comprises a plurality of horizontal axis wind turbines, such as HAWTs 100. In some exemplary embodiments, the arrays may be constructed of a composition of pillars 212 and crossbeams 211 which forms an array frame as depicted in FIG. 2B. The array frame may be connected/secured to the barge and actually constitutes integral part of barge-deck 260 structure. Additionally the array frame may be secured to barge-deck 260 by heavy duty steel cables 201 in order to withstand moments resulted by the rotating turbines. In some exemplary embodiments, a portion of crossbeams 211 may actually exceed beyond the REB200 footprint in order to fit more HAWT100 per array. Clearly the length and width of a given barge, such as barge-deck 260 will dictate the number of pillars and crossbeams, thus the overall amount of HAWT 100.

The array frame may be embedded with a plurality of turbines, such as HAWT100, in a formation intended to fit as many turbines on a given array frame in order to maximize exploitation of surface area against the wind. The array frame, depicted in the exemplary embodiment of FIG. 2B, comprises five pillars 212 and four crossbeams 211 may support forty HAWT100, which may produce together approximately 100 to 150 MW. Additionally or alternatively, arrays 210 and 230 may be identical and may be assembled parallel to one another on the REB200. Yet, the height of array 220 may be offset with respect to arrays 210 and 230 as depicted on FIG. 2C. Furthermore, the longitudinal position of array 220 may be offset with respect to arrays 210 and 230 as depicted on FIG. 2A. Since all the HAWTs100 on REB200 may face the same direction, the height and longitudinal offset between the arrays may be required to avoid aerodynamic interference to each other.

The dashed circles illustrated in FIG. 2B represent the movement path of the tip of the blades. Since wind intensity generally increases as the elevation increases, the energy harnessed at the top row of HAWTs is higher than the bottom row. The shaft of the HAWTs bottom row may be positioned approximately 100 meters above barge-deck 260 (i.e., the height of bottom crossbeam 211 from the deck). Providing that the span of the blades may be approximately 100 meters, thus the height of a second crossbeam 211 from the deck may be 210 meters (10 meters for clearance). Consequently the height of a third crossbeam 211 maybe 320 meters and the height of a top crossbeam 211 maybe 430 meters. In some exemplary embodiments; a HAWT100 mounted on the bottom row may produce 5 megawatts (MW); a $2^{nd}$ row HAWT100 may produce 7 MW; a 3rd row HAWT100 may produce 9 MW and a top row HAWT100 may produce 11 MW. Therefore, ten HAWTs100 of the bottom row can yield 50 MW, eleven HAWTs100 of the 2nd row can yield 77 MW, ten HAWTs100 of the bottom row can 90 MW, nine HAWTs100 of the bottom row can yield 99 MW, which may come to a total of 316 MW per one array and more than 900 MW for 3 identical arrays.

In some exemplary embodiments, the REB200 may be anchored to the seabed at its designated position. The anchorage is configured to allow the platforms to turn into the wind to optimize utilization of the wind's energy; therefore anchor may comprise a hub that allows free rotation of the platform connected to the anchor. The turning to the optimal orientation may occur due the presence of features such as fins, flaps, propellers coupled to the REB200, which may be driven by motors that are controlled by a controller utilizing wind sensors.

In some exemplary embodiments of the disclosed subject matter, the REB 200 may be equipped with a plurality of photovoltaic (PV) panels 266 which can be installed on barge-deck 260. At a nominal voltage of 12 volts DC (typically used to charge batteries) the peak power rating, of typical panel, which could measure approximately 1×2 meters will be rated from as low as 100 watts to as high as 300 watts, depending on the panels efficiency. In some exemplary embodiments, the REB 200, depicted in FIG. 2A, having a size of approximately 900×400 meters (360,000 $m^2$) may accommodate up to (minus 60,000 $m^2$ service area) 150,000 panels, which translates to a yield of 15 MW to 45 MW. Clearly this type of renewable energy is limited to daytime and its efficacy may be volatile due to whether condition. These factors as well as the fact the PV outcome is practically measured in DC current dictates the need to store the energy in batteries bank, which will later be inverted to AC current. The batteries bank and the inverters will be discussed later on.

In some exemplary embodiments of the disclosed subject matter, the REB 200 may have capability of storing energy due to the nature of renewable energy and the fact the harvesting yield may not be synchronized with power demands. The energy harvesting yield from the resources included in the REB200 may comprise the plurality of HAWT100, the plurality of PV panels 266, a plurality of sea-wave generator (to be discussed below), a combination thereof, or the like. In some exemplary embodiments, the energy may be stored in batteries, pressure accumulators, gravitational potential energy, a combination thereof, or the like. Additionally or alternatively, the excessive energy may be directed to a seawater desalination plant on board the REB, wherein the desalinated water may be pumped to a tanker ship mooring alongside the REB. Additionally or alternatively, some of the harnessed energy may be stored for purposes such as maintenance and utilities of the various apparatuses on the REB200. The energy stored in a form of pressure may be stored in pressure tanks located on or below the barge-deck 260, inside the pillars of the turbines, a combination thereof, or the like. In some embodiments at least some of the harnessed energy may be stored is in the form of potential energy by raising the REB200 or loads thereof.

In some exemplary embodiments of the disclosed subject matter, the REB 200 may comprise an electrical structure (ES) 262. The ES 262 may a weatherproof structure partitioned to three sections, electrical section, batteries section, control section and the like.

In some exemplary embodiments, the electrical section may comprise the REB200 power grid, DC to AC inverters, step-up transformers, transmission & distribution, a combination thereof, or the like. The grid may be utilized for aggregating all the AC power generated by the REB200 resources. The aggregating AC power may be fed to the step-up transformers in order to meet transmission & distribution requirements. Then, the power may be terminated at a designated pole 424, of FIG. 4, of the REB200. Additionally, the power may be diverted to a utility and maintenance distribution panel of the REB200 requirements. The DC to AC inverters may be utilized to alter the DC current stored in the batteries to AC current which will be aggregated to the grid with the rest of the AC power resources.

In some exemplary embodiments, the batteries section may comprise a plurality of batteries configured to store energy harvested from the plurality of PV panels 260 and the plurality of sea-wave generators (to be discussed later). Additionally or alternatively, the batteries section may comprise rectifiers configured to alter AC current generated by the plurality of HAWTs100 to DC current in order to store excessive power generated by the plurality of HAWTs100 in off peak hours.

In some exemplary embodiments, the control section may comprise a computerized control system (CCS) configured to control all the resources and aspects associated with the operation of REB200 as well as the communications.

In some exemplary embodiments, the CCS (not shown) may comprise input/output (I/O) elements; such as devices, actuators and sensors; configured to transmit and/or receive information and instructions. The I/O elements may be selected from a group comprising: global positioning system (GPS); programmable logic controllers (PLC); temperature sensors; humidity sensors; wind speed and direction sensors; wave sensors; RADAR; water depth gauge; satellite communication; GPRS and GSM communication; connection to the Internet; a combination thereof, or the like.

In some exemplary embodiments, the CCS may utilize the GPS information in order to constantly verify that the REB200 didn't drift from its designated location. Based on such information the CCS may activate the REB200 propellers (not shown) to maneuver the REB200 back to its position. Additionally or alternatively, the CCS may activate the REB200 propellers to turn the REB200 to an optimal orientation of the REB200 toward the wind in order to optimize the plurality of HAWTs100 yield. The CCS may be able to determine the optimal orientation of the REB200 based on the weather information obtained from the weather sensors listed above. Additionally or alternatively, the CCS may be able to determine the optimal orientation of the REB200 with respect to the sun in order to optimize the efficiency of the plurality of PV panels 260 yields based on the weather information obtained from the sensors listed above. Additionally or alternatively, the CCS may be able to determine the optimal orientation of the REB200 with respect to the wave direction in order to optimize the efficiency of the plurality of sea-wave generators (to be discussed below) yield based on the wave information sensors.

In some exemplary embodiments, the CCS may be configured to monitor and control each, energy harvesting, resource on the REB200 trough its dedicated PLC. As an example, upon determination of wind speed that exceeds allowable limit the CCS may disable the top rows of HAWT 100 for safety reasons. Additionally the PLCs of the energy harvesting resource may be capable of indicating malfunction and performance information of each resource for maintenance purposes.

In some exemplary embodiments, the CCS may be configured to monitor and control the transmission & distribution to the shore based on shore demand. Accordingly the CCS may be able direct excessive energy to: storage, the seawater desalination plant, a combination thereof, or the like. In some exemplary embodiments, the CCS may be monitored and/or controlled remotely from the shore by Internet protocols communicated over satellite and or a GPRS network. Additionally the CCS may be able to utilize the Internet in order to obtain whether information, or the like.

Figure 3:
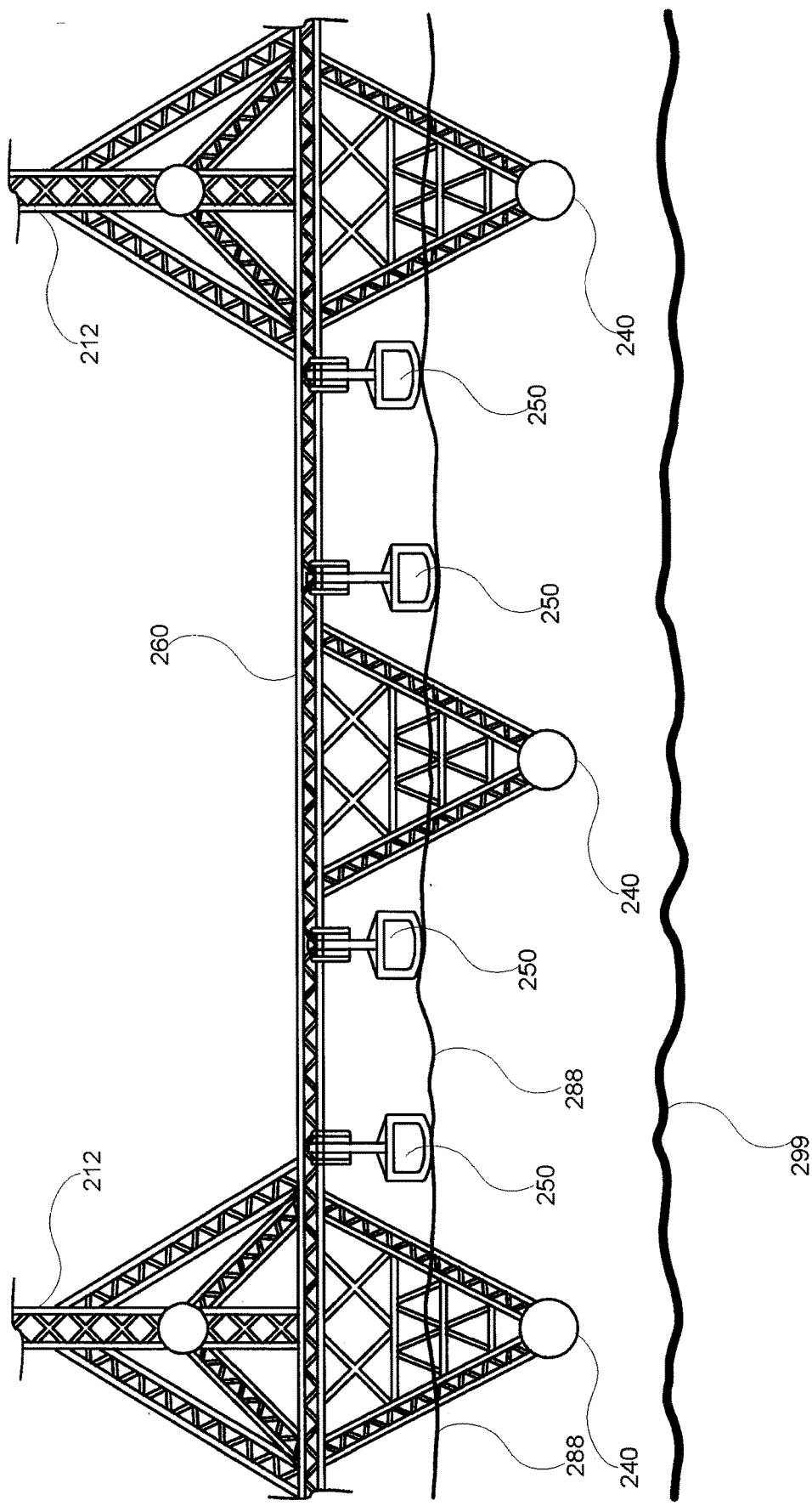
FIG. 3 shows a cross section view of the REB structure equipped with a plurality of sea-wave generator (SWG), in accordance with some exemplary embodiments of the disclosed subject matter.

Referring now to FIG. 3, showing an expanded cross section view of the REB 200 structure comprising a plurality of SWG 250, wherein the REB 200 is positioned in a semi-submersible, in accordance with some exemplary embodiments of the disclosed subject matter.

In some exemplary embodiments, the REB 200 structure may be based on a plurality of flotation pipes 240 having a diameter of at least 3 meters. REB 200 may be equipped with a flotation system configured to fill the pipes 240 with gas or seawater to allow either flotation or partial-submersion of the REB 200 respectively. In shallow waters, such as site 555 or while towing the REB 200 out to sea the REB 200 may be brought to its maximum flotation height by its flotation system. Alternatively, the REB 200 may be brought to semi-submersion at the selected site for energy-harvesting by the flotation system. In some exemplary embodiments, the pipes may be segmented to prevent excessive loss of gas in case of damage to the pipes. The pipes may comprise inner tubes made for example from rubber that may help make the pipes leak proof. It should be noted that each sealed pipe 240 of the plurality of sealed pipes 240 extend across the REB 200, and constitute the foundation of all pillars 212 as well as the barge-deck 260.

In some exemplary embodiments of the disclosed subject matter, the REB may comprise a plurality of sea-waves generator (SWG) 250 situated below the barge-deck 260. In some exemplary embodiments, a SWG 250 is based on a three phase permanent magnetized linear generator installed below barge-deck 260. The other end of the generator is connected to an energy absorbing buoy that floats on sea surface 288. When the waves move the hydrodynamic action forces the buoy to move in a heaving motion. The movements of the buoy will then drive a slider in the generator, consequently inducing current in the stator windings. The slider is connected to the generator foundation with springs that retract the slider in the wave troughs. It should be understood that the REB200 is substantially resilient to wave movement due to its enormous size and thus may be perceived stable almost as the seabed. Therefore, the significantly smaller buoy of SWG 250, linear movement reflects the sea wave energy. In some exemplary embodiments, the linear stroke of the SWG 250 may be greater than five meters. Additionally, the generator and the mechanical structure of SWG 250 may able to handle large overloads in terms of electrical and mechanical strain. The induced current will vary both in amplitude and frequency, thus the generated power cannot be directly transmitted to the grid. Hence the plurality of SWG 250 may be connected to the ES 262, of FIG. 2A, where the current from the plurality of SWG 250 be rectified and charge batteries bank, which will later be inverted to AC current.

It should be noted that that the present disclosure is not limited to the utilization of the linear sea-wave generator as described above. Other types of sea-wave generators may be utilized as well as combination of different sea-wave generators may be used without altering the scope of the present disclosure.

Figure 4:
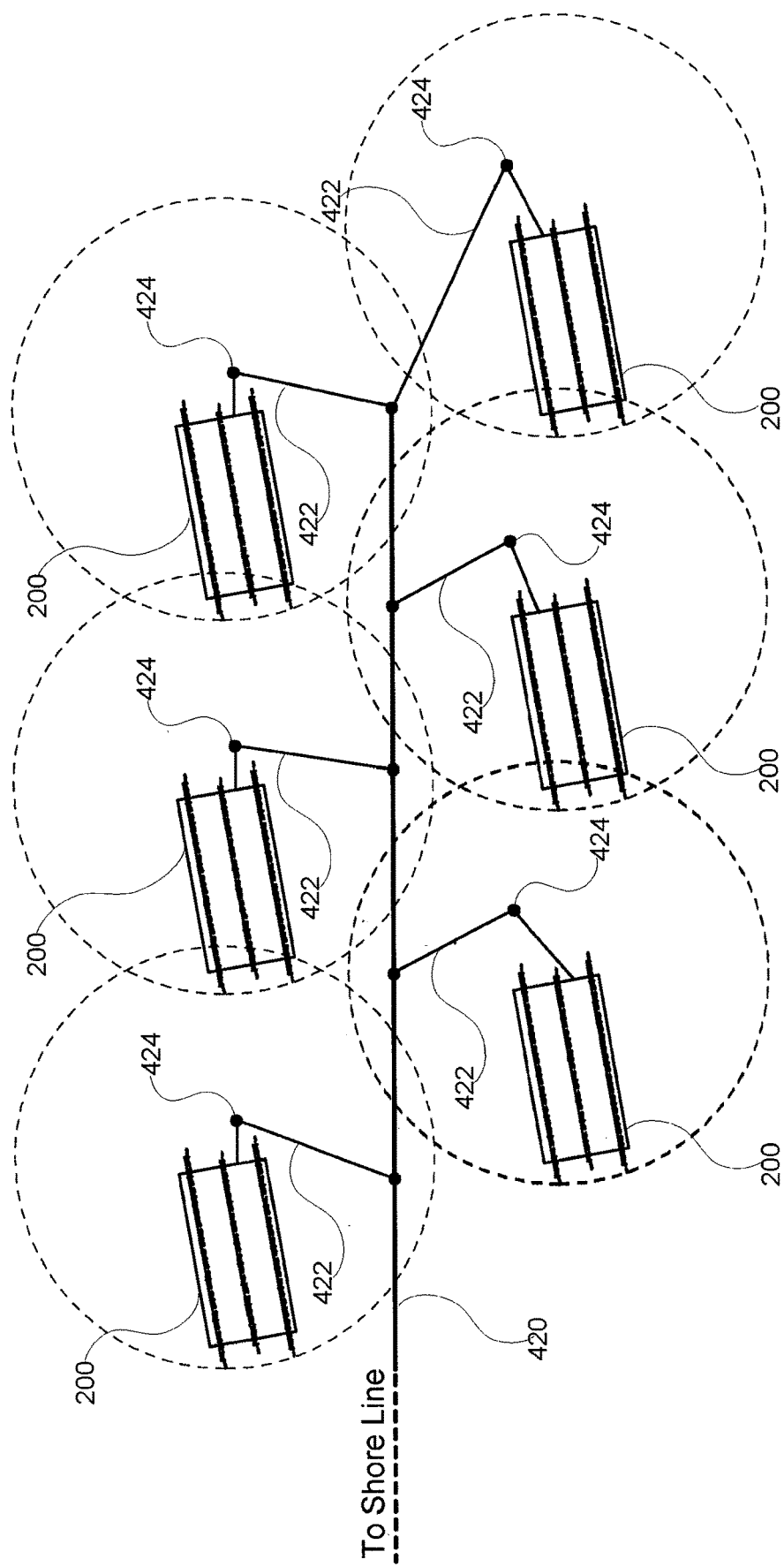
FIG. 4 illustrates a layout of renewable energy barges (REBs) fleet floating next to power transmission lines (PTL), wherein each barge is connected via the PTL to an onshore power grid, in accordance with some exemplary embodiments of the disclosed subject matter.

Referring now to FIG. 4, illustrating a site layout of REBs fleet floating next to power transmission lines (PTL) 420, wherein each REB 200 is connected via the PTL 420 to an onshore power grid, in accordance with some exemplary embodiments of the disclosed subject matter.

It will be noted that each REB may be visualized as a self contained power plant capable of converting a plurality of energy forms into three or six phase electrical alternating current (AC). It should also be noted that the preferred process for building the REB is doing most or all of the construction at a shipyard. Since the REB is floating and sea-transportable, the only major work that remains to be done on site is connecting the REB to the PTL 420 that transports the AC power to the shore.

In some exemplary embodiments, each REB outcome (i.e., AC power) may be transmitted to the shore via PTL 420, wherein each REB 200 can be connected to the PTL 420 by at least one cable branch 422 of the PTL 420. The PTL 420 may comprise at least one power cable that carries the power outcome of at least one REB, all REBs fleet and a portion thereof. In some embodiments, the PTL 420 may be an electric submarine power cable submerged below the surface of the sea and resting on the seabed. In other embodiments, the PTL 420 may be a waterproof electric power cable installed on a dock that stretches from the shore to the site of the REBs fleet. The dock may be either a floating dock or an elevated dock. Additionally or alternatively, in embodiments of shallow water the PTL 420 may be overhead transmission lines supported by poles for overhead line conductors wherein the poles may be secured to the seabed. It should be noted that the at least one PTL 420 may be: submarine power cable, waterproof cable installed on a dock, overhead transmission lines, a combination thereof, or the like.

Each at least one branch 422 may be terminated with connectors or other high power electric terminals adopted to connect the REB AC power outcome to the at least one PTL 420. In some exemplary embodiments, the branch 422 termination may be installed on top of a pole 424 substantially protrusive above the sea level, wherein the pole 424 is connected to buoy that is encored in a predetermine location of the site. It should be noted that the at least one branch 422 may be: submarine power cable, waterproof cable installed on a dock, overhead transmission lines, a combination thereof, or the like.

In some exemplary embodiments, each REB may be anchored in order to sustain its distance to its dedicated pole. An anchor may serve as a rotating axis for the REB, since each REB may have to rotate from time to time around that axis in order to face the wind.

Figure 5:
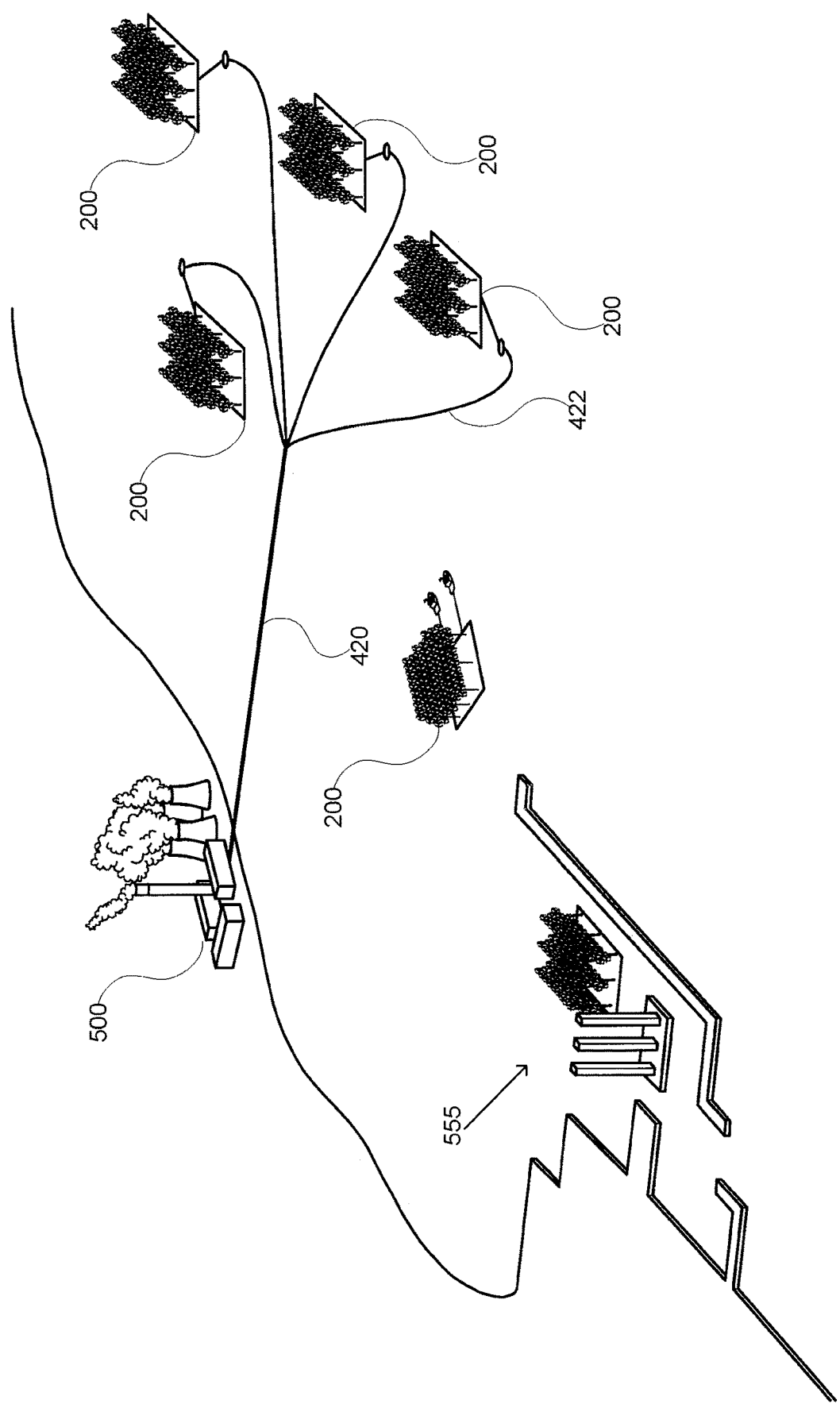
FIG. 5 illustrates a shore line of an urban area having a wharf, wherein an electrical grid of the urban area is supported by a fleet of REBs, in accordance with some exemplary embodiments of the disclosed subject matter.

Referring now to FIG. 5, illustrating a shore line of an urban area having a wharf, wherein an electrical grid of the urban area is supported by a fleet of REBs, in accordance with some exemplary embodiments of the disclosed subject matter.

The aggregated electrical power generated by a fleet of REBs and transported via PTL 420 may be terminated at an AC power supply site 500 that resides by the shore line.

In some exemplary embodiments, the AC power supply site 500 may be a power plant (i.e., generating station), a primary transmission station, a secondary transmission station, a primary distribution station, a secondary distribution, a combination thereof, or the like. It should be noted that in some embodiments, the aggregated electrical power generated by the fleet of REBs may be utilized for supplementing an, on-shore, existing electrical generating station, such as AC power supply site 500. In other embodiments, the aggregated electrical power generated by the fleet of REBs may be added to the electrical grid trough either transmission or distribution stations.

As shown in FIG. 5, the REB 200 may be constructed at a construction site 555. In some exemplary embodiments, the construction site 555 may be; a factory, a shipyard, a freight yard, or the like; located in a seaport or along a wharf, quay, quayside, a combination thereof, or the like. In some exemplary embodiments of the disclosed subject matter, the construction site 555 may comprise suitable cranes for assembling wind turbines such as HAWT 100 of FIG. 1 and other resources on the REB. Site 555 may also comprise one or more dock, ship-building apparatuses and other features for constructing, handling, and conveying the barge of the REB 200. Preferably, the rotor blades are not transported at all by land, but rather brought to the site 555 by sea or built at the site 555 itself, or partially build elsewhere and completed at the site 555. Additionally, site 555 may be may be adopted for assembling; sea wave generators, such as SWG 250 of FIG. 3; photovoltaic panels, such as PV 266 of FIG. 2A; batteries; pressure accumulators; gravitational loads; motors and propellers for turning the REB 200, AC power conductors, computerized control, sensors and all necessary devices required for the operation of the REB 200.

In some exemplary embodiments of the disclosed subject matter, the REB 200 may be towed by tugboats to a service-marine-site. The service-marine-site may be located in territorial distance of 2 to-20 km from the shoreline. Among other criteria's the distance from the shore may be dictated by the depth of the water (greater than 30 meters) and wavelength.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A barge having renewable energy resources, comprising:
   a plurality of horizontal axis wind turbines;
   a plurality of photovoltaic panels;
   a plurality of sea-wave generators;
   a flotation system comprising a plurality of flotation pipes designed to accumulate fluid, wherein the pipes extend across the barge forming foundations; and
   a plurality of pillars assembled on the foundations in rows along the barge, wherein each row comprises a plurality of pillars that support an array of turbines facing one direction,
   wherein the flotation system is capable of floating the barge by injecting gas into the flotation pipes and semi-submerging the barge by either exhausting the gas or injecting seawater into the flotation pipes,
   wherein energy harvested by the renewable energy resources is transformed to electrical energy, and
   wherein the electrical energy is transmitted to a grid onshore.

2. The barge of claim 1, wherein at least a portion of the electrical energy is stored in batteries.

3. The barge of claim 1, wherein all the electrical energy is stored in batteries.

4. The barge of claim 1, wherein at least a portion of the energy harvested by the renewable energy resources is transformed to gas pressure to be stored in pressure accumulator.

5. The barge of claim 1, wherein the energy harvested by the renewable energy resources is transformed to gas pressure to be stored in pressure accumulator.

6. The barge of claim 1, wherein at least a portion of the energy harvested by the renewable energy resources is stored as gravitational potential energy by substantially floating the barge.

7. The barge of claim 1, wherein the energy harvested by the renewable energy resources is stored as gravitational potential energy by elevating loads and or substantially float the barge.

8. The barge of claim 1, wherein the plurality of flotation pipes, having a diameter of at least three meters, form a structure covered by a barge-deck.

9. The barge of claim 1 wherein each row of pillars along the barge is enforced by a plurality of cables and cross-beams.

10. The barge of claim 8, wherein a plurality of photovoltaic panels is installed in slight incline on the barge deck.

11. The barge of claim 8, wherein the plurality of sea-wave generators is secured to below the barge deck and wherein buoys of the plurality of sea-wave generators float on the seawater.

12. The barge of claim 1, wherein the barge further comprises a seawater desalination plant, and wherein water produced by the desalination plant is pumped to a tanker ship mooring by the barge.

13. The barge of claim 1, wherein the barge is relocatable by tag boats to locations selected from the group consisting of shipyards, a plurality of deep-sea harvesting locations, and a combination thereof.

14. The barge of claim 1, wherein the barge is equipped with maneuvering capability for optimal orientation of the barge toward the wind in order to optimize the plurality of horizontal axis wind turbines yield.

15. The barge of claim 1, wherein the barge is equipped with maneuvering capability for optimal orientation of the barge toward the sun in order to optimize the plurality of photovoltaic panels yield.

16. The barge of claim 1, wherein the barge is equipped with maneuvering capability for optimal orientation of the barge in line with wave's direction in order to optimize the plurality sea-wave generators yield.

17. A barge having renewable energy resources, comprising:
   a plurality of horizontal axis wind turbines;
   a plurality of photovoltaic panels; and
   a plurality of sea-wave generators,
   wherein energy harvested by the renewable energy resources is transformed to electrical energy,
   wherein the electrical energy is transmitted to a grid onshore, and
   wherein the barge further comprises electrical structure, wherein the electrical structure comprises:
      a power grid utilized to aggregate alternating current (AC) electrical energy from all resources;
      step-up transformers for shaping the aggregated AC for transmission;
      a plurality of batteries configured to store energy;
      inverters for altering energy stored in batteries to AC;
      rectifiers configured to alter AC for storage in the batteries;
      a computerized control system (CCS) configured to monitor and control renewable energy resources; and
      an input/output interface configured to transmit and/or receive information and instructions between the CCS and elements selected from the group consisting of devices, actuators and sensors; a global positioning system; programmable logic controllers; temperature sensors; humidity sensors; wind speed and direction sensors; wave sensors; RADAR; a water depth gauge; radio communication; the Internet; and a combination thereof.

18. The barge of claim 17, wherein the CCS is further configured to monitor and control the transmission to the shore based on shore demand, and directing excessive energy for storage.

19. The barge of claim 17, wherein the CCS is further configured to enable remote control and monitoring via the Internet.

20. A barge having renewable energy resources, comprising:
   a plurality of horizontal axis wind turbines;
   a plurality of photovoltaic panels; and
   a plurality of sea-wave generators,
   wherein the barge comprises a flotation system capable of substantially floating the barge by injecting gas into a plurality of flotation pipes and semi-submerging the barge by exhausting gas from the plurality of flotation pipes or injecting seawater into the plurality of flotation pipes,
   wherein energy harvested by the renewable energy resources is transformed to electrical energy, and
   wherein the electrical energy is transmitted to a grid onshore.

* * * * *